(12) United States Patent
Song

(10) Patent No.: US 6,227,371 B1
(45) Date of Patent: May 8, 2001

(54) MEDICAL CONTAINER AND SYSTEM

(76) Inventor: Julie Song, 3665 Empire Dr., No. 9, Los Angeles, CA (US) 90034

(*) Notice: Subject to any disclaimer, the term of this patent is extended or adjusted under 35 U.S.C. 154(b) by 0 days.

(21) Appl. No.: 09/570,852

(22) Filed: May 12, 2000

(51) Int. Cl.[7] ................................................. B65D 83/04
(52) U.S. Cl. ........................... 206/534; 206/540; 215/230
(58) Field of Search ..................... 206/528, 534, 206/538, 459.1, 459.5, 570, 540; 215/230; 283/81

(56) References Cited

U.S. PATENT DOCUMENTS

| 889,394 | 6/1908 | Newman . | |
|---|---|---|---|
| 3,334,731 | 8/1967 | Dale . | |
| 3,537,422 | 11/1970 | Moe . | |
| 3,675,620 | 7/1972 | Baustin . | |
| 4,208,983 | 6/1980 | Buckley . | |
| 4,793,492 | * 12/1988 | Halbich | 206/538 |
| 4,895,257 | 1/1990 | Winslow . | |
| 5,174,451 | * 12/1992 | Niven | 206/534 |
| 5,275,567 | 1/1994 | Whitfield . | |
| 5,358,117 | 10/1994 | Adams . | |
| 5,733,127 | 3/1998 | Mecum . | |
| 5,753,350 | * 5/1998 | Bright | 206/534 |
| 5,765,706 | * 6/1998 | Barker et al. | 206/459.1 |
| 5,941,394 | * 8/1999 | Siegler | 206/534 |
| 5,979,698 | * 11/1999 | Deal | 206/534 |
| 6,032,609 | * 3/2000 | Luoma | 206/459.1 |
| 6,047,992 | * 4/2000 | Hampton | 206/534 |
| 6,089,180 | * 7/2000 | Nichols, Jr. | 206/534 |

* cited by examiner

Primary Examiner—Luan K. Bui
(74) Attorney, Agent, or Firm—Jack D. Puffer, Atty

(57) ABSTRACT

A system of containers for medications having tactile identification indicia means on the cover of the container. The originally dispensed medication is placed inside a larger container from which the medication is dispensed to the patient. The larger container having tactile indicia identifying the medication therein. The tactile indicia include at least the first letter of the name of the medication. In addition to the letters of the name of the medication, the indicia may also include the Braille symbols for the letters, as well as unique indicia for indicating the prescribed dosage and the frequency of dosage. The system may also include a separate printed chart listing the indicia for each medication for use by sighted caregivers.

5 Claims, 2 Drawing Sheets

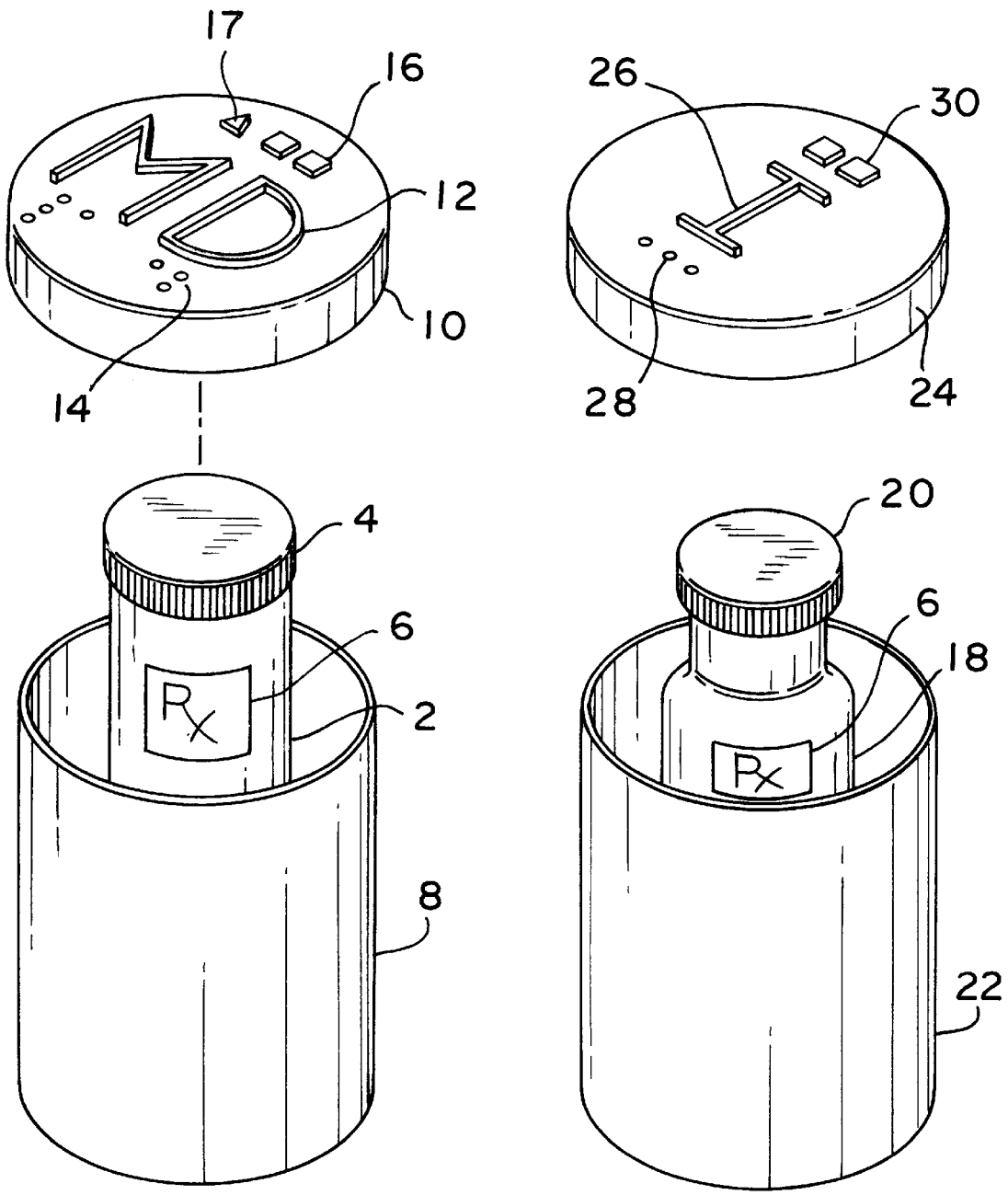

MEDICAL CONTAINER AND SYSTEM

BACKGROUND OF THE INVENTION

This invention relates in general to containers for medications and in particular, to containers for medications for use by blind or visually impaired people.

Blind or visually impaired people often have difficulty in identifying the containers for the medications they are required to take. This action is especially difficult for people who have become visually impaired in their later years. Younger people born with these handicaps or who acquire them in early childhood often are taught methods of tactilely identifying objects using the Braille system or other tactile coding systems. However, when visual impairment occurs later in life the patients have a difficult time learning and remembering an unfamiliar and complex system. Systems exist for identifying medication containers however, these systems require learning a new and unfamiliar series of coded indicators for identification.

These patients need a system using familiar letters and numbers which can be read tactilely with accuracy.

SUMMARY OF THE INVENTION

The present invention overcomes these disadvantages by placing raised indicia on the cover of the container by which the medication in the container can be readily identified. The primary indicia consist of at least the first letter of the name of the medication by which the patient identifies that medication. If the patient knows the medication by its generic name, then at least the first letter of that name will be placed on the container cover. If the patient knows the medication by its trade name then the letters of that name will be used. If more than one medication starts with the same letter, then a combination of the letters of the name will be used. If the patient knows the medication by its proprietary trade name then the letters of this name will be used.

In addition to the arabic identifying letters described above, the Braille symbols of small round raised dots for the same letters can be embossed below the arabic letter to provide an additional identifier for those familiar with the Braille system. The patient can also be reminded of the dosage prescribed and the frequency of application by providing raised symbols of unique shapes in a different location on the container cap. The medication identification system will be customized for each patient according to the patient's tactile skills and their personal identification system for their medications.

To complete the system, a customized printed sheet will be provided listing the medications along with their identifying indicia and dosage schedule for each patient. This will provide necessary information to the patient's caregivers to enable them to assist the patient in taking medications at the proper time and in the correct dosages.

BRIEF DESCRIPTION OF THE DRAWINGS

FIG. 1 illustrates a typical dispensing container inserted in a container with a tactile cover.

FIG. 2 illustrates a smaller tactile container with a tactile cover for injectable medications.

DETAILED DESCRIPTION OF THE PREFERRED EMBODIMENT

Figures 3A, 3B:
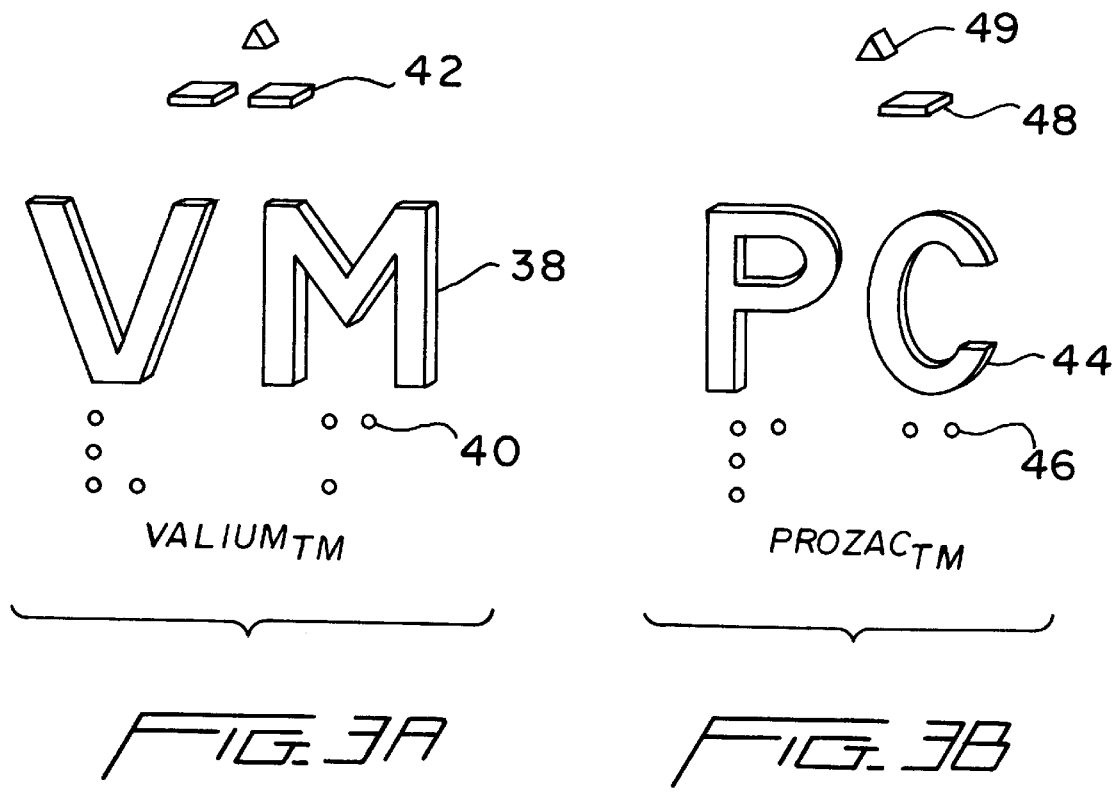
FIGS. 3A and 3B illustrate typical covers for specified medications.

Referring now to FIG. 1, there is shown a typical pharmaceutical medication dispensing container inserted into a larger container. The larger container having a tactile cover according to this invention.

The medication container 2, dispensed by the retailer is a standard well known medication container, usually of plastic material of an amber or other color having a cap 4 and a label 6 which indicates the name of the prescribed medicine, the dosage amount and frequency, the date of dispensing as well as other prescription information such as number of refills, the prescribing doctor's name and the date the prescription was filled. When the dispensed medicine is brought to the patient's living quarters, the dispensed bottle 6 is placed in a larger container 8 of any practical material which will last for several refill cycles of the medication. The cap 10 for the container 8 is the tactile cover of the invention.

In this illustration, the letters 12 showing M D, shown for illustration purposes only, have been applied to the surface of the cover and are raised above the cover surface so that they may be easily identified tactilely by the medication user to tell him the contents of the container 8. In addition, the Braille symbols 14 have been applied below each of the arabic raised letters on the cover. The symbol for M is applied in typical raised dot form under the M and the symbol for D applied under the D. Above the medication identifying letters there are applied raised symbols 16 of a shape different than the Braille shapes to indicate to the user the frequency of application of the medication. Here two rectangular raised forms indicate that the medicine is to be taken twice daily and the triangular form 17, indicates that one pill is to be taken at each time.

Referring now to FIG. 2, there is shown a smaller medication dispensing bottle 18 typically used for dispensing injectable medications. This container has the pharmacy label 6 and a special cap 20 of a soft material which allows the needle of a syringe to be inserted through the cap into the container contents to withdraw medication into the syringe. This smaller container would be placed in the storage container 22 for use by the patient. Again, the cover of this container has raised indicia 26 shown as the letter I and having the Braille symbol for I 28 below the letter. Also there are provided two raised rectangular symbols 30 to indicate that the medication is to be given twice daily.

FIGS. 3A and 3B illustrate additional examples of tactile covers according to the invention. In FIG. 3A the medication in the container having these raised indicia would be Valium, a product of Roach Pharmaaceuticals. The letters VM indicate the name of the medication, the Braille symbols for these letters 40 are shown below the letters, the two rectangular symbols 42 indicate it is to be taken twice daily and the single triangular symbol indicates a frequency of once per day. FIG. 3B shows a container cap for Prozac, a product of the Eli Lilly Company. The medication is identified as PC, the dosage is one tablet and the triangle 49 indicates a single dose daily.

If a patient is using more than one medication having the same initial letter, then another combination for each medication will be used. For example, if a patient is taking Valium (a trademark of the Roach Pharmaceutical Co), Vastotec (a trademark of Merck & CO.) and Vicodin (a trademark of the Knoll Pharmaceuticals) then Valium could be identified as VM, Vasotec a could be identified as VC and Vicodin as VN. In this illustration, the first and last letters of two medications starting with the same letter have been used. Obviously any combination of letters of the medication name can be used depending on the patients preferred identification of the medication. The illustrated letters would be placed on the cover of the container in a raised form which can be readily identified by the patient by merely feeling the top of the container for the familiar identifying letters. The containers would, of course, be available in a variety of sizes to accommodate various sizes of dispensing containers. If the container is received from the pharmacist, the original container, which has the prescription information on the label, is placed in a larger container having the identifying cover described above. Thus if the patient has a sighted caretaker, this caretaker can readily check the prescription information by removing the original dispensing container from the tactile identifiable container and reading the original pharmacy label.

Figure 4:
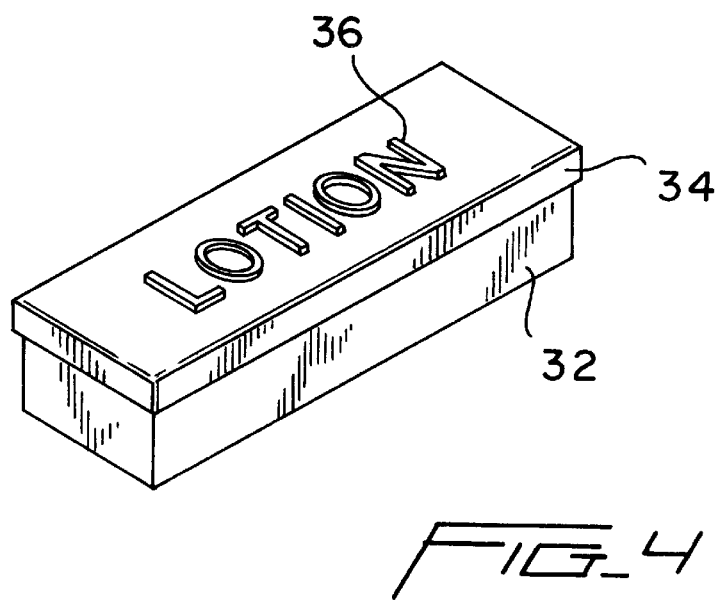
FIG. 4 illustrates an elongated container with a tactile cover for tubular dispensers.

FIG. 4 illustrates another shape of container for storing a lotion, for example, which is dispensed in the familiar tube container. The storage container of this invention would be an elongated box 32 with a lid 34 having raised indicia as shown at 36.

The tactilely identified container may, of course be reused as the prescription is renewed. The tactile containers may be provided in a variety of sizes and shapes. For example, a container for an ointment can be stored in an elongated container suitable for the familiar tube dispenser similar to a tube of toothpaste. A dispenser for drops such as eye drops would be tall enough to accommodate the bottle as well as the dropper bulb on top of the bottle. A small bottle for storing injectable medications would require only a small tactile bottle. The size and shape of the container will assist the patient in selecting the correct medication but the tactile identification on the cover will confirm the contents of the container.

For example, raised square figures can be provided at the top of the primary medication-identifying arabic letters. For example, two rectangular indicia would indicate that the medication should be taken twice daily and a single triangular dot would indicate that one pill should be taken at each time.

In some cases, the patient may have sufficient partial sight to allow them to read information if the printing is made very large and placed on a contrasting background. In these cases, the tactile symbols may be eliminated and the caps provided with large black letters on a white background so that the patient can read the medication name on the cap.

In addition to the tactile caps of the outer containers, a customized chart is generated for each patient for the use by a caregiver who may be assisting the patient in taking the medications. Below is a sample chart.

CHART 1

| Name: John Doe Patient ID. | Mfg. Name. | Dosage | Date Rev: 04-06-00 Frequency |
|---|---|---|---|
| VM | Valium | one Tab | Twice/day |
| MD | Med. | one tab | Twice/day |

As shown in CHART 1 above, the customized chart will provide a sighted caregiver with the medications the patient is to receive, the dosage and the frequency of application. In addition, it identifies the patient's name for the medication as well as the manufacturers name. There is also provided a place for the patient's name and a place to indicate the most recent revision of the chart.

Thus it can be seen that this invention provides a convenient means and method of storing a variety of medications for people who are visually impaired but have partial sight as well as those who are totally blind which allows them to readily identify their medications, the prescribed dosage and the frequency of application thus eliminating the need for a constant caregiver. In addition, a customized chart is provided for a sighted caregiver so that they may know the patients means of medication identification as well as other pertinent patient data.

What is claimed is:

1. A system for storing and dispensing medications for use by visually impaired patients, said system comprising:

a medication for a visually impaired patient, said medication having a patient's identification name and a manufacturer's name;

a container for storing said medications, said container having bottom and side surfaces and an open top;

a cover for said container, said cover having raised indicia on the upper surface thereof, said indicia comprising said patient's identification name, said patient's identification name containing at least the first letter of said manufacturer's name of said medication;

a chart comprising multiple boxes arranged in rows and columns, a first row of boxes, each box of said first row having a title indicating the content of the column below it, said titles comprising at least; the patient's identification name for the medication, the manufacturer's name for said medication, the prescribed dosage for said medication and the frequency of application of said medication; and multiple subsequent rows of boxes the appropriate information for each prescribed medication is entered in the appropriate box thereby providing medicating information for a sighted caregiver attending the patient with visual impairment.

2. The system according to claim 1 wherein said raised indicia on the cover of said container comprises the first and last letters of the manufacture's name of said medication.

3. The system according to claim 1 wherein said raised indicia on the cover of said container also includes a second indicia comprising the Braille symbols for said letters of the patient is identification name of the medication.

4. The system according to claim 3 wherein said raised indicia further comprises a third indicia of a shape unique from said first and second symbols said third indicia indicating the frequency with the medication is to be taken.

5. The system according to claim 4 and further comprising a fourth indicia of a shape unique from said first, second and third indicia, said fourth indicia indicating the prescribed dosage for said medication.

* * * * *